United States Patent [19]

Dill et al.

[11] 3,992,712

[45] Nov. 16, 1976

[54] METHOD AND APPARATUS FOR RECORDING INFORMATION ON A RECORDING SURFACE

[75] Inventors: Frederick H. Dill, South Salem; George J. Fan, Ossining; Richard A. Toupin, Briarcliff Manor, all of N.Y.

[73] Assignee: IBM Corporation, Armonk, N.Y.

[22] Filed: July 3, 1974

[21] Appl. No.: 485,409

[52] U.S. Cl. .......... 346/1; 346/75

[51] Int. Cl.$^2$ .......... G01D 15/18

[58] Field of Search .......... 346/75, 1

[56] References Cited

UNITED STATES PATENTS

| | | | |
|---|---|---|---|
| 3,136,594 | 6/1964 | Ascoli | 346/75 X |
| 3,641,588 | 2/1972 | Metz | 346/75 |
| 3,786,517 | 1/1974 | Krause | 346/75 |
| 3,805,272 | 4/1974 | Fan et al. | 346/75 |
| 3,828,354 | 8/1974 | Hilton | 346/75 X |
| 3,864,692 | 2/1975 | McDonnell et al. | 346/75 |
| 3,878,518 | 4/1975 | Garwin | 346/75 X |

*Primary Examiner*—Joseph W. Hartary
*Attorney, Agent, or Firm*—Frank C. Leach, Jr.

[57] ABSTRACT

A plurality of magnetic liquid streams is simultaneously excited to produce a plurality of streams of magnetic droplets of substantially uniform spacing and substantially uniform velocity. Each of the droplets in each of the streams passes over a separate selector for each stream to determine whether the droplet will be utilized for printing on a paper. A predetermined number of the droplets of each of the streams is subjected to a time periodic deflection to cause a first half of the predetermined number of droplets, which have been selected for printing by the selectors, to engage a paper in a first line and a second half to engage the paper in a second line. A ramp voltage deflection is separately applied to the predetermined number of droplets of each stream subjected to each half of the time periodic deflection to cause the print lines of the droplets to be orthogonal to the direction of movement of the paper.

20 Claims, 4 Drawing Figures

METHOD AND APPARATUS FOR RECORDING INFORMATION ON A RECORDING SURFACE

In ink jet printing, a stream of ink is supplied under pressure and periodically interrupted to produce droplets, which impinge upon a suitable recording surface such as a sheet of moving paper, for example. To obtain printing on the paper by the ink, it is necessary that the droplets be spaced substantially uniform distances from each other, be of substantially uniform size, and be formed at a high rate such as about $10^5$ per second, for example.

To produce the desired print pattern on the paper, the droplets must be individually directed to the paper or deflected prior to reaching the paper in accordance with the pattern to be printed. To obtain the deflection of the droplets, which are not to strike the paper, it is necessary that the droplet be capable of being deflected. Thus, the droplets must be electrostatically charged or have magnetic properties, for example, in order to be deflected. All of the magnetic droplets have the magnetic properties whereas only either the droplets, which are being deflected, or the droplets, which are not to be deflected, are electrostatically charged.

To produce a line on the paper of the droplets from a single stream, it is necessary to cause a plurality of the droplets from the stream to strike the paper in a scan. One previously suggested means of causing a plurality of droplets from a single stream to print a line on a paper is shown in U.S. Pat. No. 3,369,252 to Adams.

In the aforesaid Adams patent, a plurality of electrostatically charged droplets from the stream is disposed within a deflector and have a deflection applied thereto simultaneously when the paper is not being moved to cause the droplets to strike the paper simultaneously in a line. Thus, the aforesaid Adams patent requires that the paper movement be synchronized with the deflection of the electrostatically charged droplets onto the paper so that the paper is not moving when the droplets are applied thereto.

The present invention does not require any stopping of the movement of the paper to print a plurality of droplets in a scan from one or more streams. Thus, the present invention allows the paper to continuously move and eliminates the requirement for synchronization of the movement of the paper when the droplets of a stream are applied to the paper.

In the aforesaid Adams patent, it is necessary to not utilize any droplets produced during the time that the droplets are within the deflector and being applied to the paper. During this time, it is necessary that the droplets in the aforesaid Adams patent be directed to the surplus reservoir.

The present invention avoids this problem since the droplets of the stream can print lines on the paper during scans in both directions. Thus, with the present invention, it is not necessary to waste the droplets during the return of flyback scan.

The present invention also enables a plurality of streams to have the droplets simultaneously applied to the paper in a single scan. Thus, the present invention is particularly useful in ink jet line printers in which many lines of print are produced at a relatively high speed since the present invention enables the droplets from many streams to be printed simultaneously in a single straight line.

The present invention accomplishes the foregoing through applying a time periodic deflection to at least each of the droplets of each stream to be applied to the paper. Through utilizing a second deflection, which is orthogonal to the time periodic deflection, all of the droplets during any scan can be maintained in the same straight line which is orthogonal to the relative movement betweem the streams and the paper.

By applying the time periodic deflection to a predetermined number of the droplets within time periodic deflection means when the time periodic deflection is initially applied and then causing the droplets, which are continuously moving through the time periodic deflection means to advance through the time periodic deflection mens so that a new group of the predetermined number of the droplets is within the time periodic deflection means when the time periodic deflection is stopped, there is no waste of the droplets during the return or flyback scan. Thus, all of the predetermined number of the droplets within the time periodic deflection means at any time that the time periodic deflection is applied are subjected to a varying magnitude of deflection.

The first of the new group of the predetermined number of droplets to exit from the time periodic deflection means has the maximum deflection thereon and the last of the new group of the predetermined number of the droplets to exit has the minimum deflection thereon. This is opposite to the droplets within the time periodic deflection means when the time periodic deflection is initially applied since the first of these droplets has the minimum deflection applied thereto and the last of these droplets has the maximum deflection applied thereto. The use of the second deflection, which is orthogonal to the time periodic deflection, compensates for varying delays in the application to the paper, which continues to have relative movement with respect to the streams of droplets, of the continuously moving droplets which, have had the time periodic deflection applied thereto, in accordance with the location of each of the droplets within the time periodic deflection means when the time periodic deflection is initially applied or stopped.

An object of this invention is to provide ink jet printing of a plurality of columns in a row or a plurality of rows in a column on a recording surface from a single jet.

Another object of this invention is to provide a method and apparatus for recording information on a recording surface with magnetic droplets for recording in a plurality of columns in a row or a plurality or rows in a column on a recording surface from a single jet.

A further object of this invention is to provide ink jet printing with a plurality of droplets from a single jet being produced in a single line on a recording surface without any waste of droplets between lines.

The foregoing and other objects, features, and advantages of the invention will be apparent from the following more particular description of the preferred embodiment of the invention as illustrated in the accompanying drawings.

Figure 1:
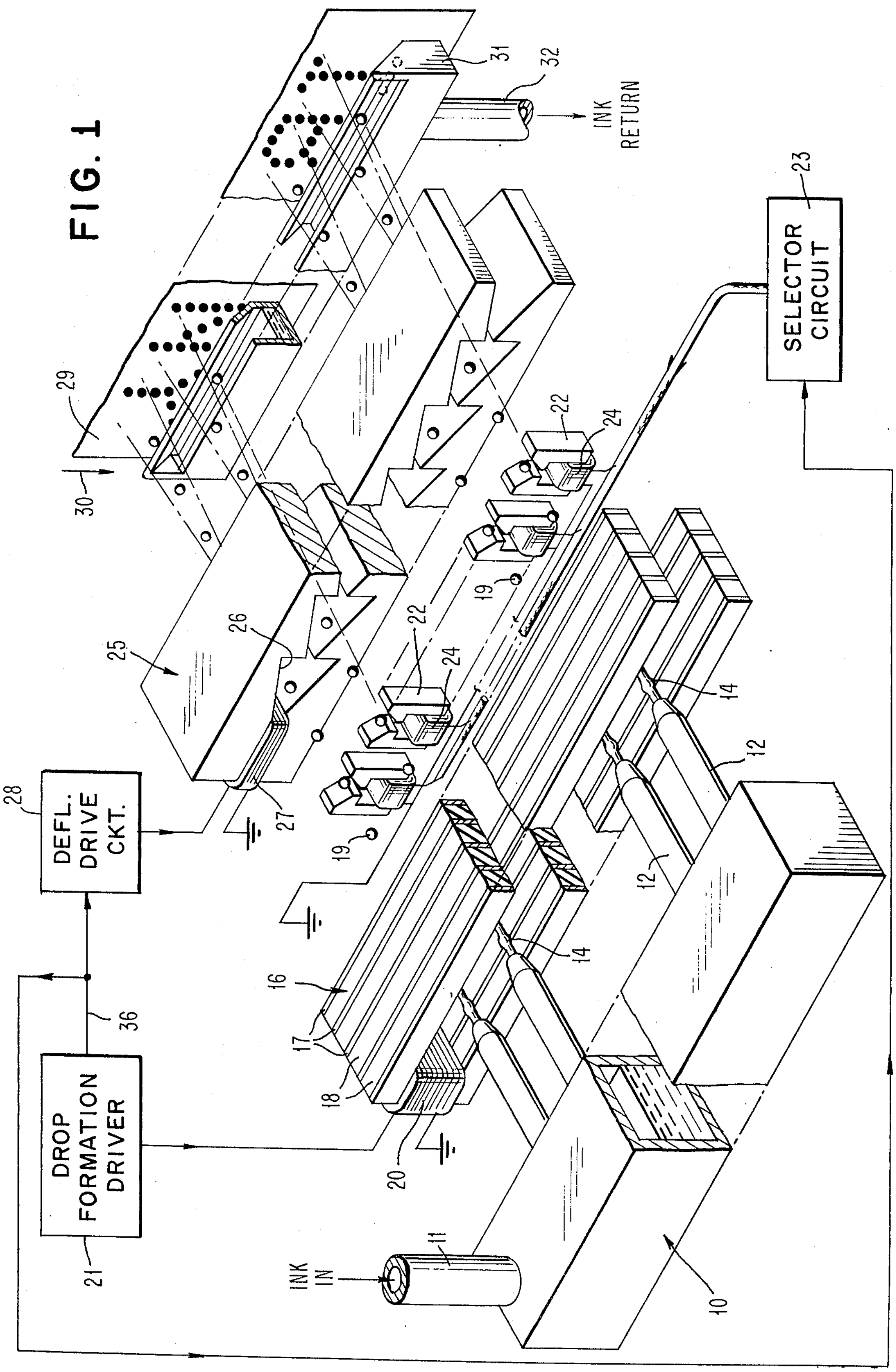
FIG. 1 is a schematic perspective view of an ink jet printer in which the present invention is used.

Referring to the drawings and particularly FIG. 1, there is shown an ink reservoir 10 to which ink is supplied through a supply tube 11. The ink is preferably a magnetic ink, which is preferably isotropic and virtually free of remanence. One suitable example of the magnetic ink is a ferrofluid described in U.S. Pat. No. 3,805,272 to George J. Fan et al. Any other liquid having the desired magnetic characteristics can be employed as the ink.

A plurality of nozzles 12 extends from the ink reservoir 10, which has the ink therein under a suitable pressure, to direct a plurality of liquid streams 14 therefrom. Each of the nozzle 12 supplies its stream 14 to a drop generator or exciter 16.

The drop generator 16 is preferably formed of a plurality of C-shaped magnets 17 with C-shaped spacers 18 of non-magnetic material therebetween as more particularly shown and described in the copending patent application of George J. Fan et al. for "Method and Apparatus For Forming Droplets From a Magnetic Liquid Stream," Ser. No. 429,414, filed Dec. 28, 1973, and assigned to the same assignee as the assignee of this application. The magnets 17 are less than the desired wavelength between droplets 19, which are formed from the streams 14 passing through the drop generator 16. The center to center distance between the magnets 17 is preferably a wavelength or an integral of the wavelength of the droplets 19.

The droplets 19 are simultaneously produced from each of the streams 14 through applying a periodic current to a coil 20, which is wrapped around one end of the drop generator 16. A drop formation driver 21 supplies current pulses to the coil 20 to produce the desired excitation of each of the streams 14 simultaneously whereby the droplets 19 in each of the streams 14 have the desired substantially uniform spacing and the desired velocity as more particularly described in the aforesaid Fan et al. application. Since the frequency of pulses from the drop formation driver 21 is controlled, the velocity of the droplets 19 of each of the streams 14 remains substantially the same because of the spacing between the magnets 17 of the drop generator 16 as more particularly explained in the aforesaid Fan et al. application.

After each of the streams 14 has been excited to form the droplets 19 in each of the streams 14 with substantially uniform spacing therebetween and the droplets 19 in each of the streams 14 have substantially the same velocity, the droplets 19 of each of the streams 14 passes through a separate selector 22. Each of the selectors 22 produces a deflection, which is substantially orthogonal to the direction of the droplets 19, on the droplet 19 within the selector 22 if the selector 22 applies a magnetic force to the droplet 19 when it is within the selector 22.

One suitable example of the selector 22 is shown and described in the aforesaid Fan et al. patent. Any other suitable means for applying a deflection to a magnetic drop may be employed.

Each of the selectors 22 has its coil 24 separately controlled from a selector circuit 23 to determine whether the selector 22 is magnetized for the droplet 19 in the stream 14 within the selector 22 at that time. The selector circuit 23 is synchronized with the pulses from the drop formation driver 21 so that the magnetization or non-magnetization of each of the droplets 19 occurs when one of the droplets 19 is within the selector 22.

After passing through the selectors 22, the droplets 19 pass through a deflector 25, which applies a time periodic horizontal deflection to all of the droplets 19 of each of the streams 14 within the deflector 25 when the time periodic horizontal deflection is initially applied and to all of the droplets 19 of each of the streams 14 within the deflector 25 when the time periodic horizontal deflection is stopped. As shown in FIG. 1, the deflector 25 has a plurality of triangular shaped passages 26 extending therethrough with each of the passages 26 having the droplets 19 of one of the streams 14 pass therethrough.

The deflector 25 is formed of a suitable magnetic material so that the application of a periodic current to a coil 27, which is wrapped around one end of the deflector 25, produces a magnetic field gradient within each of the passages 26. The magnetic field gradient for each of the passages 26 increases towards the smaller end of the passage 26.

When the periodic current is applied to the coil 27 of the deflector 25, all of the droplets 19 within the deflector 25 are subjected to the horizontal deflection. The droplet 19, which is closet to the exit of the deflector 25, is subjected to the minimum horizontal deflection while the droplet 19, which is in the deflector 25 and closet to the entrance when the magnetic field gradient is initially applied to the droplets 19 within each of the passages 26, has the maximum horizontal deflection applied thereto.

The periodic current is supplied to the coil 27 from a deflector drive circuit 28, which is synchronized with the pulses produced from the drop formation driver 21. Thus, after the periodic current has been supplied to the coil 27, it will be stopped by the deflector drive circuit 28 after the deflector drive circuit 28 has received the number of pulses from the drop formation driver 21 equal to the predetermined number of droplets within the deflector 25 at the time of initial application of the periodic current to the coil 27.

When the deflector drive circuit 28 stops the supply of periodic current to the coil 27, the same predetermined number of the droplets 19 are in the deflector 25. Each of these droplets 19 also has been subjected to a varying horizontal deflection when the periodic current was supplied to the coil 27 with the maximum deflection being applied to the droplet 19 closest to the exit of the deflector 25 and the minimum deflection being applied to the droplet 19 closest to the entrance of the deflector 25 when the periodic current is stopped.

The deflector drive circuit 28 allows periodic current to again be suppled to the coil 27 after the same predetermined number of pulses have been produced from the drop formation driver 21. This insures that the next time that the periodic current is supplied to the coil 27 that all of the predetermined number of the droplets 19 within the deflector 25 have not been exposed to the magnetic field gradient therein.

Accordingly, the magnetic field gradient in each of the passages 26 in the deflector 25 causes all of the first group of the predetermined number of the droplets 19 therein to be displaced different horizontal distances as each of the droplets 19 exists from the passage 26 with the last of the droplets 19 exiting being displaced the greatest horizontal distance. Then, during the time that the magnetic field gradient is not applied, the second group of the predetermined number of the droplets 19 also exists from the passage 26 with different horizontal displacement distances because each of these droplets 19 also was subjected to the magnetic field gradient during the movement of the droplets 19 through the deflector 25. However, the maximum displacement is the first droplet 19 of the second group of the droplets 19 to exit from the deflector 25, and the minimum displacement is the last droplet 19 to exit from the passage 26 in the deflector 25.

As a result, the droplets 19 exiting from the passage 26 of the deflector 25 strike a recording surface such as a paper 29 in a plurality of columns in a single row at any particular time. That is, since the paper 29 moves in the vertical direction indicated by an arrow 30, the droplets 19 from one of the passages 26 in the deflector 25 produce all of the print spots for a number of columns, depending on the number of the droplets 19 within the deflector 25 when the magnetic field gradient is initially applied, in each of the rows but only one row at a time.

If the droplet 19 is subjected to magnetic deflection by the selector 22 when passing therethrough, the deflected droplet 19 will not engage the paper 29 but will fall into a gutter 31 because of the deflection applied thereto by the selector 22. The gutter 31 is connected by a return tube 32 to the supply tube 11 of the ink reservoir 10 to return the ink thereto.

The deflector drive circuit 28 supplies a current pulse to the coil 27 every other time that the number of the droplets 19 formed from each of the streams 14 is equal to the number of the droplets 19 within the deflector 25 when the magnetic field gradient is initially applied. Thus, after each time that the droplet formation driver 21 supplies the predetermined number of current pulses to the coil 20 to indicate the formation of that number of the droplets 19 in each of the streams 14, the deflector drive circuit 28 either starts or stops the periodic current to the coil 27.

When the deflector drive circuit 28 starts the periodic current to the coil 27, the magnetic field gradient is produced within each of the passages 26 simultaneously and for the length of time that the current is supplied to the coil 27. Then, the deflector drive circuit 28 stops the periodic current to the coil 27 for the same period of time as it allowed the current to be supplied.

Accordingly, the deflector drive circuit 28 controls the application of the magnetic field gradient so that the same number of the droplets 19 are within the deflector 25 at either the starting or stopping of the magnetic field gradient through starting or stopping the periodic current to the coil 27. This insures that each group of the droplets 19 within the passage 26 at the starting or stopping of the current to the coil 27 has the same varying deflection applied to the droplets 19 therein.

Figure 4:
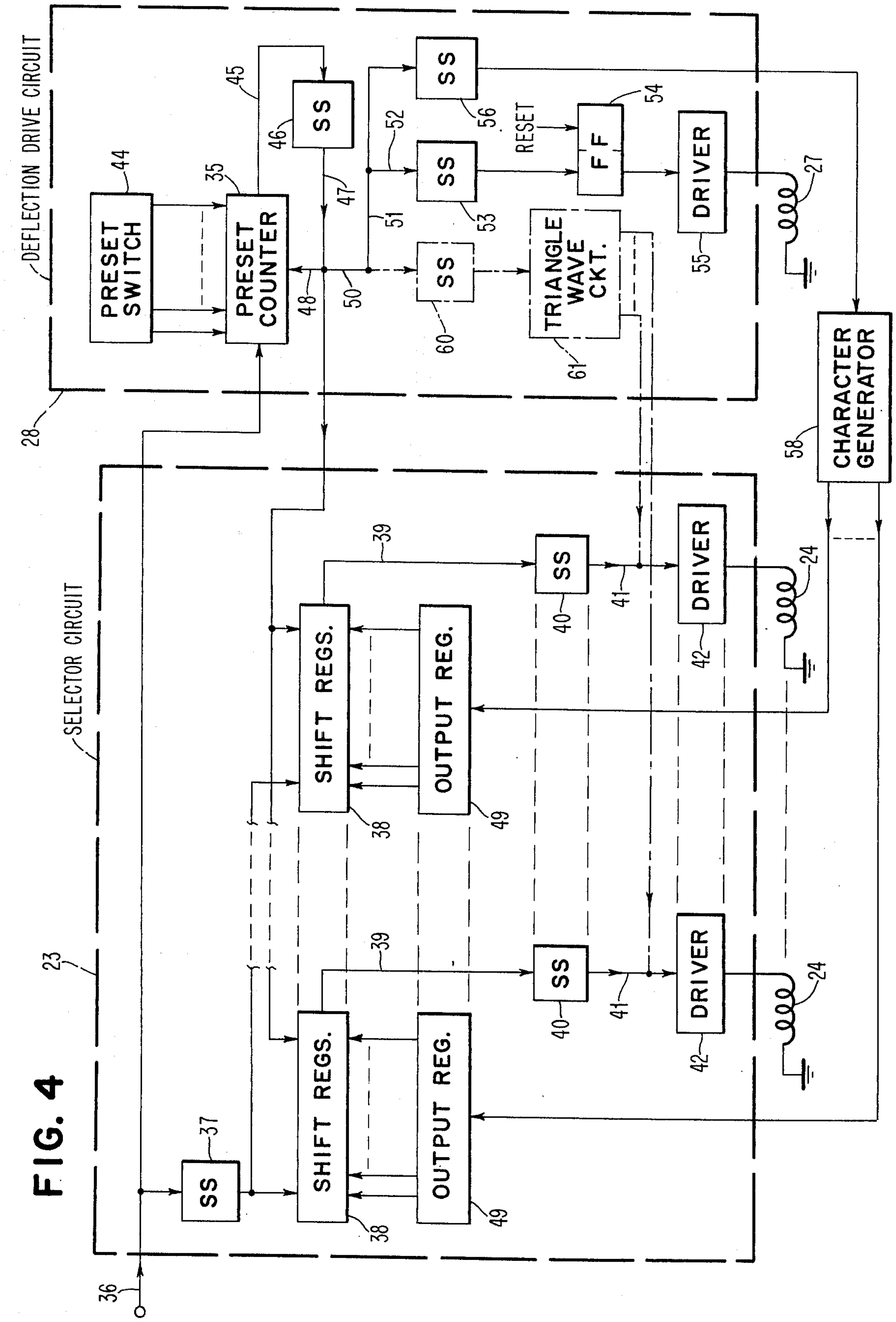
FIG. 4 is a schematic block diagram of the circuitry of the present invention.

Referring to FIG. 4, the deflector drive circuit 28 has a counter 35 connected by a line 36 to the drop formation driver 21. The drop formation driver 21 also is connected to a single shot 37 of the selector circuit 23. The single shot 37 is connected to a plurality of separate parallel-in, serial-out shift register 38.

The single shot 37 is fired each time that the drop formation driver 21 supplies a current pulse to the coil 20. The single shot 37 causes each of the connected shift registers 38 to shift with the bit in its rightmost position being supplied by a line 39 to a single shot 40. Whenever the rightmost position bit of the shift register 38 is a logical zero, the single shot 40 produces a positive output on its output line 41 for supply to its connected selector driver 42, which is connected to the coil 24 for the selector 22 with which the single shot 40 is used.

Accordingly, the shift register 38, which has the information stored therein at the start of each scan, determines whether the connected single shot 40 is fired for a particular one of the droplets 19 formed from the stream 14 passing through the selector 22 with which the coil 24 cooperates. Thus, the single shot 37 synchronizes the timing of the pulse to the connected coil 24 in accordance with when one of the droplets 19 is passing through the selector 22. It should be understood that the single shot 37 is fired in accordance with when a current pulse is supplied to the coil 20 of the drop formation driver 21, but the droplet 19, which is formed from each of the streams 14 because of the current pulse from the drop formation driver 21, is not the same droplet 19 arriving at the particular selector 22.

The counter 35 is set by a preset switch 44 to a predetermined count before producing an output pulse on its output line 45. The counter 35 counts down for each current pulse on the line 36 from the drop formation driver 21 until the counter 35 reaches zero. When this occurs, the counter 35 produces a positive pulse on the output line 45 to fire a single shot 46. The single shot 46 is fired after the drop generator 16 has produced the same number of droplets 19 as the predetermined number of the droplets 19 to be disposed within the deflector 25 when current to the coil 27 is started or stopped.

The single shot 46 produces a positive pulse on its output line 47 for supply by a line 48 to the counter 35 to reset the counter 35 to its preset number, which is the number of the droplets to be within the passage 26 when the magnetic field gradient is initially applied or stopped by the deflector 25. The positive pulse from the single shot 46 also is suppled by the output line 47 to each of the shift registers 38 to reload each of the shift registers 38 from separate output registers 49. When the positive pulse from the single shot 46 is supplied to the shift registers 38, a parallel-in input is supplied to each of the shift registers 38 from the connected output register 49. This contains the data for the next scan line by the droplets 19 in the stream 14 with which the connected selector coil 24 of the selector 22 is cooperating.

The output line 47 of the single shot 46 also is connected by lines 50, 51, and 52 to a single shot 53. The single shot 53 supplies a positive pulse to a flip flop 54 whenever the single shot 46 is fired.

The flip flop 54 is connected to the coil 27 of the deflector 25 through a driver 55. Thus, after the number of the droplets 19 formed from each of the streams 14 comprises the number of the droplets 19 for printing the columns in a row on the paper 29, the flip flop 54 provides an output to the driver 55.

When the flip flop 54 has a positive output, the periodic current is supplied to the coil 27 to produce the magnetic field gradient within each of the passages 26 in the deflector 25. When the flip flop 54 supplies a negative output to the driver 55 and this occurs every cycle, the supply of current to the coil 27 is stopped so that the magnetic field gradient within each of the passages 26 in the deflector 25 is removed.

To insure that the first output from the flip flop 54 is positive, the flip flop 54 is reset at the start. This is necessary to insure that the first selected group of the droplets 19 is printed in the forward scan as this is the direction for which the droplets 19 have been selected for printing.

The line 51 also is connected to a single shot 56 so that the single shot 56 fires whenever the single shot 46 fires. The output of the single shot 56 is supplied after a delay to a character generator 58. This causes the character generator 58, which can be the central processing unit of a computer, for example, to supply data to each of the output registers 49 to replace the data supplied from the output registers 49 to the connected shift registers 38 when the single shot 46 fired. Thus, the delay must be sufficient to enable the data in each of the output registers 49 to have been transferred to the connected shift register 38 before new information is transferred to each of the output registers 49 from the character generator 58.

During the time that the flip flop 54 is supplying current to the coil 27 of the deflector 25, additional current pulses are being supplied from the drop formation driver 21 to the drop generator 16. Each of the droplets 19 formed at this time, which is a flyback or return scan, could be discarded to the gutter 31 through energizing all of the selectors 22. If the droplets 19 are not used during the return or flyback scan, the paper if fed at an angle to the vertical so that compensation is made for the relative movement between the paper 29 and the droplets 19 from each of the passages 26 of the deflector 25.

However, the droplets 19 produced during the time that the coil 27 is energized to produce the magnetic field gradient within each of the passages 26 in the deflector 25 also can be utilized during the flyback or return scan. To accomplish this, compensation must be made for the relative movement between the paper 29 and the droplets 19 during the scans in each direction.

Accordingly, a single shot 60 is connected to the single shot 46 through the lines 47 and 50. The firing of the single shot 60 activates a triangle wave circuit 61, which can be a ramp voltage generator and is connected to each of the selector drivers 42 for the coil 24 of each of the selectors 22.

The triangle wave circuit 61 supplies a current increasing with time to the coil 24 of each of the selectors 22. This increasing current with respect to time causes each of the selectors 22 to produce an increasing magnetic deflection orthogonal to that produced by the magnetic field gradient in each of the passages 26 in the deflector 25. This increasing current is supplied from the time that the magnetic field gradient is applied until the magnetic field gradient is stopped and from the time that the magnetic field gradient is stopped until the magnetic field gradient is started.

Figure 2:
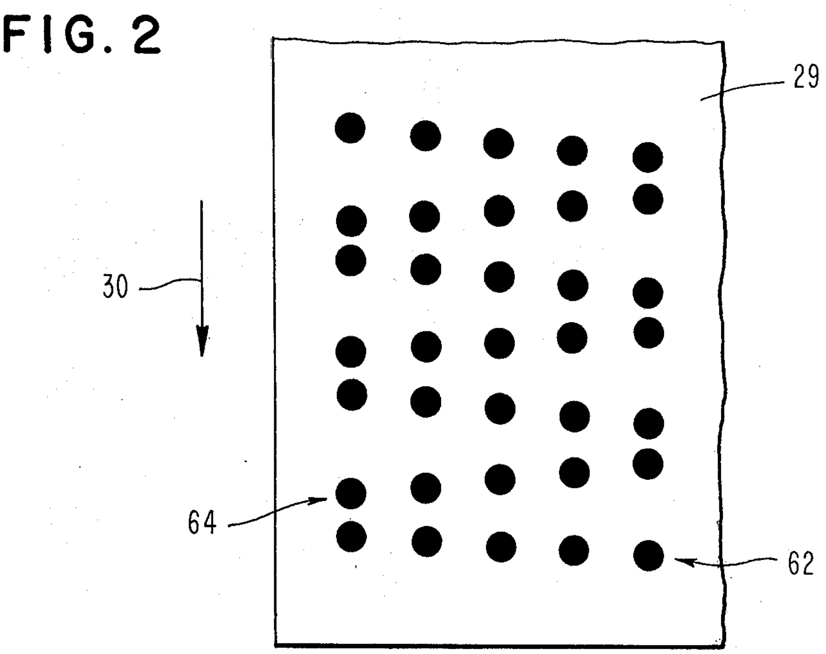
FIG. 2 is a schematic view showing the print produced from a single jet of the present invention.

Accordingly, during the forward scan, the increasing magnetic deflection causes each of the droplets 19, which are being deflected to the left because of the increasing magnetic field in this direction due to the shape of the passages 26 in the deflector 25, to be returned to a straight horizontal line. As shown in FIG. 2, an inclined row 62 of the droplets 19 is produced by the deflector 25 if the paper 29 is not fed at an angle to the droplets 19 and the triangle wave circuit 61 is not utilized. However, with the utilization of the triangle wave circuit 61, the row 62 becomes the straight horizontal row 63 of FIG. 3.

Figure 3:
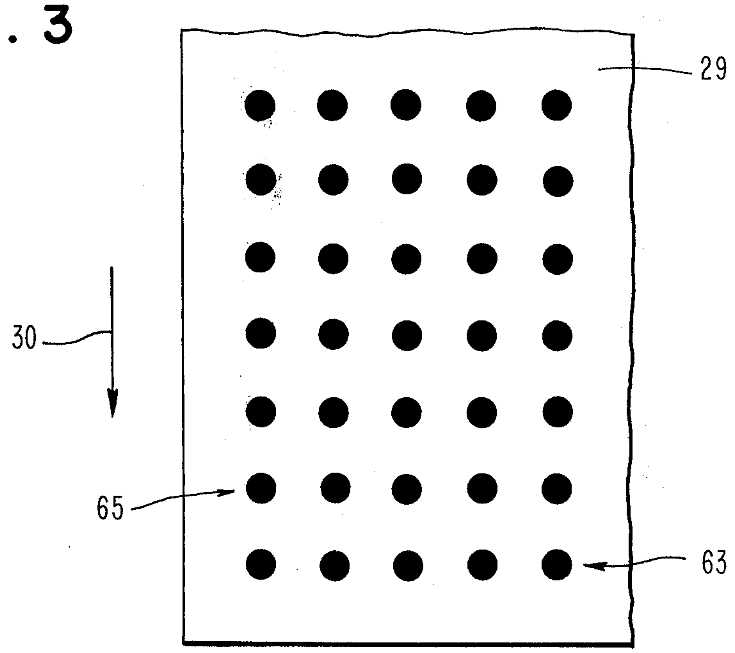
FIG. 3 is a schematic view, similar to FIG. 2, but showing a rectangular print matrix produced by using a second deflection.

During the flyback or return scan, the droplets 19 would produce an inclined row 64 on the paper 29 with the row 64 inclined opposite to the row 62 as shown in FIG. 2 if the circuit 61 is not employed. However, with the use of the triangle wave circuit 61, the row 64 of the droplets 19 becomes a straight horizontal row 65 as shown in FIG. 3. Accordingly, the triangle wave circuit 61 enables the zig-zag pattern of FIG. 2 to be changed to the rectangle print matrix of FIG. 3 and the droplets 19 to be utilized in both scans.

Thus, each time that the counter 35 counts down to zero, the single shot 46 fires to supply the increasing output from the triangle wave circuit 61 to each of the selector drivers 42. This increasing output from the triangle wave circuit 61 produces the increasing deflection from each of the selectors 22 with the deflection being in the same direction as that in which the selectors 22 deflect the droplets 19 which are to be deposited in the gutter 31 and not used for printing. However, the magnitude of the deflection produced by the triangle wave circuit 61 is much less than that produced for deflection of the droplet 19 into the gutter 31.

It should be understood that the triangle wave circuit 61 can be utilized in both directions of scan or only the forward scan if the droplets 19 are to be discarded in the flyback or return scan. Of course, with only forward scan, the paper 29 could have its feed tilted to compensate for the relative movement between the paper 29 and the droplets 19.

Considering the operation of the present invention, the drop formation driver 21 continuously produces pulses to the coil 20 of the drop generator 16 at the desired frequency to generate the droplets 19 from each of the streams 14 with a desired velocity and wavelength. Each of the selectors 22 is turned on or left off for each of the droplets 19 in accordance with the output of the shift register 38 connected to the coil 24 of the selector 22 through the single shot 40 and the driver 42. Of course, if the triangle wave circuit 61 is being utilized, then each of the coils 24 of each of the selectors 22 has a time changing signal from the triangle wave circuit 61 added thereto simultaneously and producing a deflection in the same direction.

The deflector 25 produces the magnetic field gradient in each of the passages 26 every other time that the counter 35 goes to zero since this indicates that the deflector 25 has the predetermined number of the droplets 19 in each of the passages 26 to produce the desired number of columns from each of the streams 14 of the droplets 19. After the magnetic field gradient is produced, each of the droplets 19 exiting from one of the passages 26 in the deflector 25 has a different deflection thereon to print various characters on the paper 29. Each of the streams 14 produces a plurality of columns at the same time across the paper 29 in a row or line.

During the return scan with the use of the triangle wave circuit 61, each of the streams 14 of the droplets 19 produces the same number of columns in another row or line in accordance with the pattern to be formed on the paper 29. While the magnetic field gradient is not produced during the return scan, each of the droplets 19, which prints during the return scan, has been subjected to the magnetic field gradient during the time that the magnetic field gradient was applied to each of the passages 26 in the deflector 25 since the magnetic field gradient is turned off only after the last of the droplets 19 which were in the deflector 25 at the time of initial application of the magnetic field gradient has exited therefrom. Thus, the continuously moving droplets 19, which are used during the return scan, are within the deflector 25 when the magnetic field gradient is applied.

An example of using the droplets 19 for printing in both the forward and return scans can be seen in FIG. 1. The letter "I" results in three of the droplets 19 of one of the streams 14 being applied to the paper 29 during the first or forward scan and only one of the droplets 19 of one of the streams 14 being applied to the paper during the second scan, which is the return or flyback scan. All of the other droplets 19 of the stream 14 within the passage 26 are deflected to the gutter 31.

Instead of using the droplets 19 to produce visually readable characters as the print pattern on the paper 29, it should be understood that the droplets 19 could be employed to produce magnetic spots. These magnetic spots could be read by a suitable magnetic reader, for example.

As previously mentioned, the flip flop 54 must be reset at the start to insure that writing in the forward scan occurs when the first selected group of the droplets 19 are in print. This is necessary irrespective of whether there is to be writing in the forward scan or both the forward and return scans.

It is it desired to not print during the return or flyback scan and the triangle wave circuit 61 is being employed, the shift register 38 for each of the coils 24 of each of the selectors 22 is set so that is has a logical zero as an output throughout the return or flyback scan. This prevents the triangle wave circuit 61 from being effective since all of the droplets 19 would be deflected to the gutter 31 by the selector 22.

It should be understood that the strength of the deflection produced by the output of the single shot 40 is much greater than the maximum deflection produced by the output of the triangle wave circuit 61. This insures that any of the droplets 19, which are deflected by the triangle wave circuit 61, cannot be moved into the gutter 31 because of the deflection produced by the triangle wave circuit 61.

While the present invention has shown and described the paper 29 as moving relative to the streams 14 of the droplets 19, it should be understood that such is not a requisite for satisfactory operation. Thus, the nozzles 12, the drop generator 16, the selectors 22, and the deflector 25 could be mounted on a movable structure for movement relative to the paper 29. Furthermore, the relative movement between the paper 29 and the streams 14 of the droplets 19 could be in the horizontal direction rather than the vertical direction.

While the present invention has shown and described the streams 14 as being formed of a magnetic material, it should be understood that such is not a requisite for satisfactory operation. Thus, the droplets 19 could be electrostatically charged.

While the present invention has shown and described the droplets 19, which are not to be employed for printing, as being diverted to the gutter 31 after passing through the deflector 25, it should be understood that the gutter 31 could be disposed between the selectors 22 and the deflector 25 is desired. Thus, only the droplets 19, which are to be printed, would pass through the deflector 25 rather than all of the droplets.

While the selectors 22 have been shown and described as providing the deflection for any of the droplets 19 to be deflected to the gutter 31 and the deflection for compensating for the relative movement between the paper 29 and each of the droplets 19, it should be understood that this is not necessary for satisfactory operation of the present invention. The deflection for compensating for the relative movement could be supplied through a separate magnet rather than the magnet of the selector 22 if desired.

An advantage of this invention is that only a single periodic current source is required to produce desired printing characters. Another advantage of this invention is that a rectangle print matrix may be produced without discarding any of the droplets during the return or flyback scan.

While the invention has been particularly shown and described with reference to a preferred embodiment thereof, it will be understood by those skilled in the art that various changes in form and details may be made therein without departing from the spirit and scope of the invention.

What is claimed is:

1. A method for recording information on a recording surface including:

simultaneously generating a plurality of substantially parallel streams of substantially uniformly spaced droplets from a plurality of magnetic liquid streams for application to the recording surface with each of the streams having substantially the same velocity;

producing relative movement between the recording surface and the streams;

separately selecting the droplets of each of the streams to be applied to the recording surface having relative movement with respect to the streams;

directing each of the streams of droplets through a deflecting means;

applying a magnetic field gradient from the deflecting means to the same number of droplets of each of the streams passing through the deflecting means to produce a deflection on each of the droplets of each of the streams in an orthogonal direction to that in which relative movement occurs between the recording surface and the streams to produce a scan of the plurality of the droplets of each of the streams for printing, if selected, in a plurality of spots in a line on the recording surface;

and synchronizing the starting and stopping of the application of the magnetic field gradient to the droplets of each of the streams passing through the deflecting means in accordance with the simultaneous generation of the droplets of each of the streams so that the deflections in the orthogonal direction are applied to the desired number of droplets.

2. The method according to claim 1 including:

simultaneously generating the droplets by periodically applying at least one magnetic field simultaneously to each of the streams to simultaneously excite the streams;

and counting each time that the magnetic field is applied to the streams to control when the magnetic field gradient is applied and the time period during which the magnetic field gradient is applied.

3. The method according to claim 2 including synchronizing the selection of the droplets with the simultaneous generation of the droplets of each of the streams.

4. The method according to claim 3 including determining whether the droplet is selected in accordance with each time that the magnetic field is applied to each of the streams to simultaneously excite the streams to produce droplets therefrom.

5. The method according to claim 1 including synchronizing the selection of the droplets with the simultaneous generation of the droplets of each of the streams.

6. The method according to claim 5 including determining whether the droplet is selected in accordance with each time that one of the droplets is formed from each of the streams.

7. An apparatus for recording information including:

a recording surface;

means to generate a stream of substantially uniformly spaced droplets from a magnetic liquid stream for application to the recording surface, one of the recording surface and the stream having relative movement with respect to the other;

selector means to select the droplets of the stream to be applied to the recording surface;

deflecting means having the stream of droplets pass therethrough;

means to apply a magnetic field gradient from said deflecting means to droplets passing through said deflecting means to produce a deflection on each of the droplets in an orthogonal direction to that in which relative movement occurs between the recording surface and the stream to produce a scan of the plurality of the droplets for printing, if selected, in a plurality of spots in a line on the recording surface;

means to synchronize the starting and stopping of the application of the magnetic field gradient by said applying means in accordance with the generation of the droplets of the stream by said generating means so that the deflection in the orthogonal direction are applied to the desired number of droplets;

said selector means including means to selectively apply deflections to each of the droplets;

means to produce a compensation output to cause application of a deflection to at least each of the droplets, which is to be printed on the recording surface, to compensate for the relative movement between the recording surface and each of the droplets to cause each of the droplets of each of the scans to engage the recording surface in a line substantially orthogonal to the direction of relative movement between the recording surface and the stream;

said selector means having the output of said producing means supplied to said selectively deflection applying means thereof to act on the droplets;

and said selector means including second means to cause application by said selectively deflection applying means of a deflection, greater than the maximum deflection caused by said producing means, to each of the droplets not selected for application to the recording surface.

8. The apparatus according to claim 7 in which said producing means includes ramp voltage means to cause production of a deflection on each of the droplets.

9. The apparatus according to claim 7 in which:

said generating means includes:

first means having the liquid magnetic stream supplied thereto;

and second means to supply pulses periodically to said first means to excite the stream within said first means to produce droplets therefrom;

said synchronizing means includes means to count the number of pulses from said second means of said generating means to control when said applying means applies the magnetic field gradient and the time period during which the magnetic field gradient is applied;

means to synchronize the selection of droplets by said selector means with the generation of the droplets of the stream by said generating means;

and said droplet selection synchronizing means includes means responsive to each of the pulses from said second means of said generating means to determine whether said selector means selects the droplet.

10. The apparatus according to claim 9 in which said producing means includes ramp voltage means to cause production of a deflection on each of the droplets.

11. An apparatus for recording information including:

a recording surface;

means to simultaneously generate a plurality of substantially parallel streams os substantially uniformly spaced droplets from a plurality of magnetic liquid streams for application to the recording surface with each of the streams having substantially the same velocity, one of the recording surface and the streams having relative movement with respect to the other;

separate selector means for each of the streams to select the droplets of each of the streams to be applied to the recording surface having relative movement with respect to the streams;

deflecting means having the plurality of streams of droplets passing therethrough;

means to apply a magnetic field gradient from said deflecting means to droplets of each of the streams passing through said deflecting means to produce a deflection on each of the droplets of each of the streams in an orthogonal direction to that in which relative movement occurs between the recording surface and the streams to produce a scan of the plurality of the droplets of each of the streams for printing, if selected, in a plurality of spots in a line on the recording surface;

said applying means applying the magnetic field gradient to the same number of droplets of each of the streams passing through said deflecting means;

and means to synchronize the starting and stopping of the application of the magnetic field gradient by said applying means in accordance with the simultaneous generation of the droplets of each of the streams by said generating means so that the deflections in the orthogonal direction are applied to the desired number of droplets of each of the streams.

12. The apparatus according to claim 11 in which:

said generating means includes:

first means having the plurality of the liquid magnetic streams supplied thereto;

and second means to supply pulses periodically to said first means to simultaneously excite each of the streams within said first means to produce droplets therefrom;

and said synchronizing means includes means to count the number of pulses from said second means of said generating means to control when said applying means applies the magnetic field gradient and the time period during which the magnetic field gradient is applied.

13. The apparatus according to claim 12 including means to synchronize the selection of droplets by each of said selector means with the simultaneous generation of the droplets of each of the streams by said generating means.

14. The apparatus according to claim 13 in which said droplet selection synchronizing means includes means responsive to each of the pulses from said second means of said generating means to determine whether each of said selector means selects the droplet.

15. The apparatus according to claim 14 in which:

each of said separate selector means includes means to selectively apply deflections to each of the droplets of one of the streams;

means to produce a compensation output to cause application of a deflection to at least each of the droplets of each of the streams, which is to be printed on the recording surface, to compensate for the relative movement between the recording surface and each of the droplets to cause each of the droplets of each of the streams of each of the scans to engage the recording surface in a line substantially orthogonal to the direction of relative movement between the recording surface and the streams;

each of said separate selector means has the output of said producing means supplied to said selectively deflection applying means thereof to act on the droplets of the stream with which said separate selector means cooperates;

and each of said separate selector means includes second means to cause application by said selectively deflection applying means of a deflection, greater than the maximum deflection caused by said producing means, to each of the droplets not selected for application to the recording surface.

16. The apparatus according to claim 15 in which said producing means includes ramp voltage means to cause production of a deflection on each of the droplets of each of the streams.

17. The apparatus according to claim 11 including means to synchronize the selection of droplets by each of said selector means with the simultaneous generation of the droplets of each of the streams by said generating means.

18. The apparatus according to claim 17 in which said droplet selection synchronizing means includes separate means for each of said selector means responsive to the simultaneous generation of each of the droplets of each of the streams by said generating means to determine whether each of said selector means selects the droplet.

19. The apparatus according to claim 11 in which:

each of said separate selector means includes means to selectively apply deflections to each of the droplets of one of the streams;

means to produce a compensation output to cause application of a deflection to at least each of the droplets of each of the streams, which is to be printed on the recording surface, to compensate for the relative movement between the recording surface and each of the droplets to cause each of the droplets of each of the streams of each of the scans to engage the recording surface in a line substantially orthogonal to the direction of relative movement between the recording surface and the streams;

each of said separate selector means has the output of said producing means supplied to said selectively deflecting applying means thereof to act on the droplets of the stream with which said separate selector means cooperates;

and each of said separate selector means includes second means to cauce application by said selectively deflection applying means of a deflection, greater than the maximum deflection caused by said producing means, to each of the droplets not selected for application to the recording surface.

20. The apparatus according to claim 19 in which said producing means includes ramp voltage means to cause production of a deflection on each of the droplets of each of the streams.

* * * * *